UNITED STATES PATENT OFFICE 2,439,302

PREPARATION OF BENZOTETRONIC ACID

Martin E. Hultquist, Bound Brook, N. J., assignor to American Cyanamid Company, New York, N. Y., a corporation of Maine No Drawing. Application October 23, 1944, Serial No. 560,041

3 Claims. (Cl. 260—344.6)

This invention relates to a new method of preparing benzotetronic acid, or, as it is also known, 4-hydroxycoumarin.

Benzotetronic acid is an old compound which has recently become of considerable importance as an intermediate in the preparation of 3,3'-methylene-bis-(4-hydroxycoumarin), a blood anticoagulant. The acid is also useful in the synthesis of other organic compounds. Unfortunately, known methods of synthesizing benzotetronic acid require the use of relatively expensive intermediates and reaction conditions which increase the cost of the product to an unreasonable degree.

The present invention is based upon my discovery that the acetyl group of 3-acetylbenzotetronic acid may be removed, without otherwise affecting the molecule, to yield benzotetronic acid. Removal of the acetyl group is brought about by heating the 3-acetyl benzotetronic acid in a strong mineral acid, containing a small amount of water. Sulphuric acid is the preferred acid because of its low cost but other strong mineral acids which do not react with the intermediate or final product to form other substances may be used.

The amount of acid used in the hydrolysis is not particularly critical but should be within the range of from two or three mols to about twelve or more mols of acid for each mol of 3-acetylbenzotetronic acid. Preferably I use from about six to ten mols of acid for each mol of the intermediate.

The temperature at which the reaction is carried out is preferably around 90 to 100° C. but higher or lower temperatures may be employed if desired. Higher temperatures, above about 110° C. cause some decomposition whereas lower temperatures require a longer reaction period. The reaction will take place at a reasonable rate at temperatures above 60° C., and at a lower rate at lower temperatures.

The 3-acetylbenzotetronic acid which is used as the starting material in the present invention may be easily and cheaply prepared from acetyl salicylyl chloride and ethyl acetoacetate by the process shown in the specific example which follows. It will be obvious therefore that my new process provides a better and cheaper means of preparing benzotetronic acid than theretofore available.

My invention will now be described in greater particularity by means of the following example in which the preparation of 3-acetylbenzotetronic and subsequently benzotetronic acid therefrom is described.

Example

To a mixture of 19.5 g. (0.15 mol) of ethyl acetoacetate, 50 cc. of water, 50 g. of ice, and 10 g. of 50% sodium hydroxide contained in a 500 cc. flask was added 9.9 g. (0.05 mol) of acetyl salicylyl chloride. The mixture was shaken vigorously and the temperature maintained at 5°–10° C. by occasionally dipping the flask in an ice bath. After ten minutes another portion of 10 g. of 50% sodium hydroxide and 9.9 g. of acetyl salicylyl chloride were added and the shaking continued. The mixture gradually set up to a thick crystalline paste. After fifteen minutes, this was dissolved by adding 350 cc. of water and heating to 90° C. A water-insoluble oily layer was extracted with isopropyl acetate, 50 g. of sodium chloride was added to the aqueous layer, and the aqueous solution was cooled to 20° C. to crystallize the sodium salt. The sodium salt was removed, redissolved in 400 cc. of boiling water and the product precipitated by adjusting the solution to a pH of 3 with hydrochloric acid. After cooling, filtering, washing and drying there was obtained 12 g. of crude 3-acetylbenzotetronic acid, melting at 135°–137° C. This represents a 59% yield based on the acetylsalicylyl chloride.

To 1800 g. (18.4 mols) of 93% sulfuric acid was added with stirring 450 g. (2.2 mols) of 3-acetylbenzotetronic acid. The mixture was heated to 95°–98° C. for four and one-half hours and then poured into a mixture of 9 liters of water and 3500 g. of ice. The resulting slurry of fine needle crystals was filtered, washed free of sulfuric acid, and dried. A yield of 323 g. (90.5%) of benzotetronic acid melting at 210°–212° C. was obtained.

I claim:

1. A method of preparing benzotetronic acid which comprises heating 3-acetylbenzotetronic acid with a strong mineral acid until the 3-acetyl group has been removed.

2. A method of preparing benzotetronic acid which comprises heating 3-acetylbenzotetronic acid with sulfuric acid until the 3-acetyl group has been removed.

3. A method of preparing benzotetronic acid which comprises heating at a temperature within the range 60°–110° C. 3-acetylbenzotetronic acid with 6 to 10 mols of a concentrated aqueous solution of sulfuric acid for each mol of 3-acetylbenzotetronic acid until the 3-acetyl group has been removed.

MARTIN E. HULTQUIST.

REFERENCES CITED

The following references are of record in the file of this patent:

UNITED STATES PATENTS

| Number | Name | Date |
|---|---|---|
| 1,934,361 | Levinson | Nov. 7, 1933 |

OTHER REFERENCES

Anschutz, Liebigs Annalen, vol. 367, pages 194 and 196. Photostat in Division 63.

Unit Processes in Organic Synthesis—Groggins, McGraw-Hill (1938), pp. 590–594. Copy in Div. 63.